(12) United States Patent
Aronovich et al.

(10) Patent No.: US 8,438,139 B2
(45) Date of Patent: *May 7, 2013

(54) DYNAMIC REWRITE OF FILES WITHIN DEDUPLICATION SYSTEM

(75) Inventors: Lior Aronovich, Toronto (CA); Samuel Krikler, Herzelia (IL); Asaf Levy, Rishon Le Zion (IL); Amit Schreiber, Kiriat Ata (IL)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/958,200

(22) Filed: Dec. 1, 2010

(65) Prior Publication Data

US 2012/0143832 A1 Jun. 7, 2012

(51) Int. Cl.
*G06F 7/00* (2006.01)
(52) U.S. Cl.
USPC .......................................................... 707/692
(58) Field of Classification Search .................. None
See application file for complete search history.

(56) References Cited

U.S. PATENT DOCUMENTS

| 7,584,338 | B1 | 9/2009 | Bricker et al. | |
| 7,747,584 | B1 * | 6/2010 | Jernigan, IV | 707/692 |
| 2008/0155192 | A1 | 6/2008 | Iitsuka | |
| 2009/0100115 | A1 | 4/2009 | Park et al. | |
| 2009/0204650 | A1 * | 8/2009 | Wong et al. | 707/204 |
| 2009/0271402 | A1 * | 10/2009 | Srinivasan et al. | 707/6 |
| 2009/0327625 | A1 * | 12/2009 | Jaquette et al. | 711/160 |
| 2010/0088296 | A1 * | 4/2010 | Periyagaram et al. | 707/705 |
| 2010/0088349 | A1 | 4/2010 | Parab | |
| 2010/0094817 | A1 | 4/2010 | Ben-Shaul et al. | |
| 2010/0121825 | A1 * | 5/2010 | Bates et al. | 707/692 |
| 2010/0161608 | A1 | 6/2010 | Jain et al. | |
| 2010/0199065 | A1 | 8/2010 | Kaneda | |
| 2010/0205158 | A1 | 8/2010 | Dybas | |
| 2010/0223441 | A1 | 9/2010 | Lillibridge et al. | |

OTHER PUBLICATIONS

IBM, "Detecting and Eliminating Fuzzy Duplication Based on Query Log," www.IP.com, IPCOM000159632D, Oct. 23, 2007, 7 pages.
Chuanyi Liu et al., "ADMAD: Application-Driven Metadata Aware De-deduplication Archival Storage System," IEEE, 978-0-7695-3408-4/08, 2008, pp. 29-35.

* cited by examiner

*Primary Examiner* — Neveen Abel Jalil
*Assistant Examiner* — Kellye Buckingham
(74) *Attorney, Agent, or Firm* — Griffiths & Seaton PLLC

(57) ABSTRACT

A dynamic layer above a sequential deduplication file system (denoted as DFS) implements the rewrite functionality. A user file is composed of one or more DFS files. As incoming data is written into a user file, the data is written by the dynamic layer sequentially into DFS files, created one by one. For each user file this dynamic layer creates and maintains a dynamic metadata file, in a regular, non deduplicated file system. This metadata file contains entries pointing to sections of DFS files.

14 Claims, 6 Drawing Sheets

DYNAMIC REWRITE OF FILES WITHIN DEDUPLICATION SYSTEM

BACKGROUND OF THE INVENTION

1. Field of the Invention

The present invention relates in general to computers, and more particularly to apparatus and computer program product embodiments for rewriting data in deduplication computing storage environments.

2. Description of the Related Art

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and reduction of network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

SUMMARY OF THE INVENTION

Many deduplication storage systems employ sequential and static deduplication file systems. In such file systems a file is created sequentially, and rewrites of previous sections of the file are generally not supported. A rewrite of a previous section of a file is defined as an operation that modifies a section within a file, such that the other sections of that file remain unmodified. The reason for employing such file systems in deduplication storage systems is twofold. First, many deduplication storage systems are designed to store data which is written into the system primarily in a sequential manner. A prime example is deduplication storage systems designed to store backup data. In such environments, where data deduplication is generally highly effective due to the inherent redundancy of data in periodic backups, the data is generally written into the system in a sequential manner. Second, such file systems tend to be efficient in both their required storage and processing time, relative to file systems that allow additional operations.

However, even in environments where the data is generally written sequentially to a deduplication file system, rewrites of sections of files may be required to be supported to some extent. For example, there are backup applications that may need to rewrite some sections of the files written sequentially to the deduplication storage system. Normally, the required rewrite functionality in such cases is limited and the use cases are mostly predefined. In these cases employing a fully dynamic file system is generally not an efficient approach due to their associated overhead. A need exists for a mechanism for implementing efficient rewrite functionality in deduplication storage systems, which employ sequential and static file systems. Efficiency is measured in both storage and processing time.

Further to the above problem, an implementation of a rewrite functionality over a sequential and static file system may involve loss of storage capacity, since due to the sequential and static nature of the file system it is challenging to efficiently delete the data being overwritten by the rewrites. Therefore, an important requirement in this context is avoiding such loss of storage capacity, while maintaining an efficient solution.

In view of the foregoing, various embodiments for rewriting data in a deduplication storage environment by a processor device are provided. A dynamic layer above the sequential deduplication file system (denoted as DFS) implements the rewrite functionality. A user file is composed of one or more DFS files. As incoming data is written into a user file, the data is written by the dynamic layer sequentially into DFS files, created one by one. For each user file this dynamic layer creates and maintains a dynamic metadata file, in a regular, non deduplicated file system (denoted as RFS). This metadata file contains entries pointing to sections of DFS files. Processing of rewrite operations is generally implemented by storing the rewritten data in new DFS files; quoting the unmodified data from the original DFS files which are affected by the rewrites, into new DFS files, which may be those containing the rewritten data or additional files; deleting the original DFS files affected by the rewrite operations; and modifying the entries in the metadata file maintained in the RFS by the dynamic layer to reflect the new layout of the data in the user file.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for implementation of efficient rewrite functionality in deduplication storage systems, which employ sequential and static file systems. A deduplication storage system may employ internal functionality for quoting or referencing sections of existing files when creating a new file. This functionality is useful for achieving deduplicated storage of the incoming data. One aspect of the illustrated embodiments utilizes this quoting functionality of such file systems to achieve efficient storage of the data being rewritten and efficient processing time of the rewrite functionality, as detailed following.

In one embodiment, a dynamic layer above the sequential deduplication file system (denoted as DES) implements the rewrite functionality. A user file is composed of one or more DFS files, which may be of fixed or variable size. As incoming data is written into a user file, the data is essentially written by the dynamic layer sequentially into DFS files, which are created by this layer one by one. For each user file this dynamic layer creates and maintains a dynamic metadata file, in a regular, non deduplicated file system (denoted as RFS). This metadata file contains entries pointing to sections of DFS files.

Processing of rewrite operations may, in one embodiment, be generally implemented by storing the rewritten data in new DFS files; quoting the unmodified data from the original DFS files which are affected by the rewrites, into new DFS files, which may be those containing the rewritten data or additional files; deleting the original DFS files affected by the rewrite operations; and modifying the entries in the metadata file maintained in the RFS by the dynamic layer to reflect the new layout of the data in the user file as will be further described, following.

The mechanisms of the illustrated embodiments provide an efficient solution for supporting rewrite functionality over sequential and static deduplication file systems. These mechanisms are efficient in storage, since loss of storage capacity due to rewrites is avoided. The mechanisms are efficient in processing time, since they capitalize on inherent efficiency of quoting functionality in deduplication file systems (versus the slower copy functionality, for example).

Figure 1:
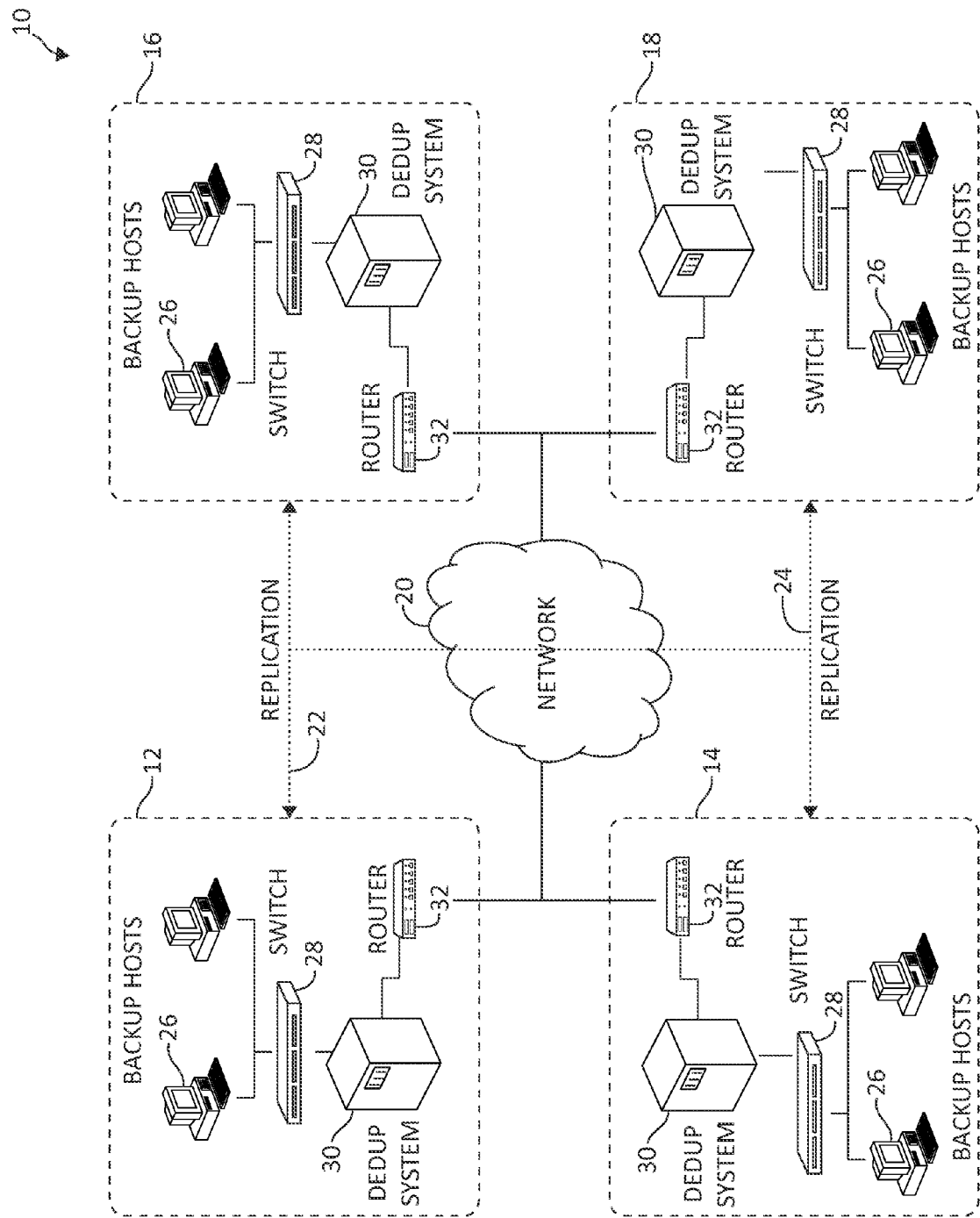
FIG. 1 illustrates an exemplary computing environment in which aspects of the present invention may be implemented.

Turning now to FIG. 1, exemplary architecture 10 of deduplication systems and related components in a computing storage environment is depicted, in which various aspects of the illustrated embodiments may be implemented. Architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18. A network 20 connects such deduplication systems 30 and routers 32. Network 20 may, in one embodiment, include a wide area network (WAN). In other embodiments, network 20 may include local area networks (LANs), storage area networks (SANs), and other network topologies known to the skilled artisan. While routers 32 and switches 28 are shown, the skilled artisan will also appreciate that additional and/or substitute networking components are contemplated.

In one embodiment, switch 28 is compliant with a fibre channel network protocol, making the switch 28 and interconnected components capable of executing commands such as small computer systems interface (SCSI) commands. Such commands may be executed for a variety of storage devices, again as the skilled artisan will appreciate, such as disk drives, tape devices, solid state devices (SSDs), and the like. While the architecture 10 provides one example of components that may be utilized to implement various facets of the present invention and claimed subject matter, the skilled artisan will appreciate that other such architectures are contemplated.

The mechanisms of the illustrated embodiments may be adapted to simultaneously accommodate a variety of limit specifications of various dimensions and types, which have one common attribute in that they are all measured in time. Each measurement is determined by its respective limit (e.g., bytes processed are determined by B/sec limit). Also, the measurements are translated to their respective debt (or credit) and the algorithm normalizes the whole vector of debts to a single delay time parameter. Whenever a particular chunk reported by a single worker creates too much debt (regardless which measure created the debt), the worker abstains from further processing according to the calculated delay time.

In the following illustrated embodiments, a layer above the sequential deduplication file system is used to implement the rewrite functionality. This layer is denoted as the dynamic layer. User files are created and maintained via this layer rather than directly via the sequential deduplication file system.

A user file is composed of one or more sequential deduplication file system (DFS) files, which may be of fixed or variable size. In a backup environment, user files are generally large (containing part or an entire backup image), hence the DFS files constituting the user file may be of a relatively large size. In one embodiment, the size of a DFS file is 1 GB. As incoming data is written into a user file, the data is essentially written by the dynamic layer sequentially into DFS files, which are created one by one by this layer.

For each user file the dynamic layer creates and maintains a dynamic metadata file, in a regular, non deduplicated file system (RFS). This metadata file contains entries pointing to sections of DFS files. Each such entry may point to an entire DFS file or a section of such a file. The fields constituting an entry are the following: offset in the user file, identification of a DFS file, offset in the DFS file, and the size of the section specified by the entry. As a user file is initially created, the entries added to the metadata file generally point to entire DFS files. As rewrites are applies to the user file, such entries may be modified to point to sections of DFS files.

Figure 2:
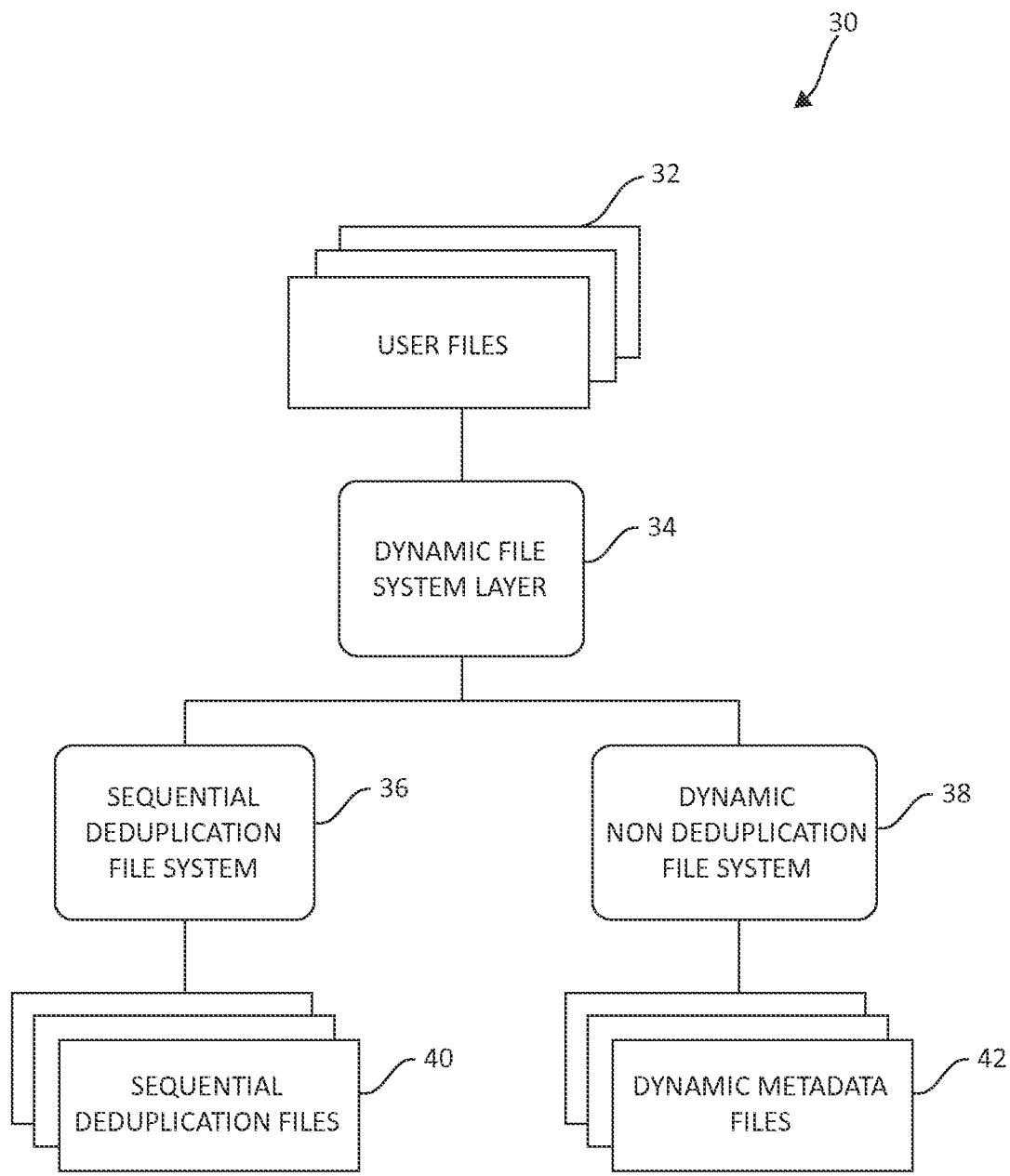
FIG. 2 illustrates an exemplary dynamic file system layer, in which various aspects of the illustrated embodiments may be implemented.

FIG. 2, following, is a block diagram illustration of an exemplary dynamic file system layer architecture 30, in which various aspects of the illustrated embodiments may be implemented. A number of user files 32 are implemented by a dynamic file system layer 34, which in turn uses a sequential deduplication file system 36 and a dynamic non deduplicated file system 38 to implement the user files 32. Sequential deduplication file system 36 and the dynamic non deduplication file system 38 contain, respectively, a plurality of sequential deduplication files 40 and dynamic metadata files 42, as shown.

Figure 3:
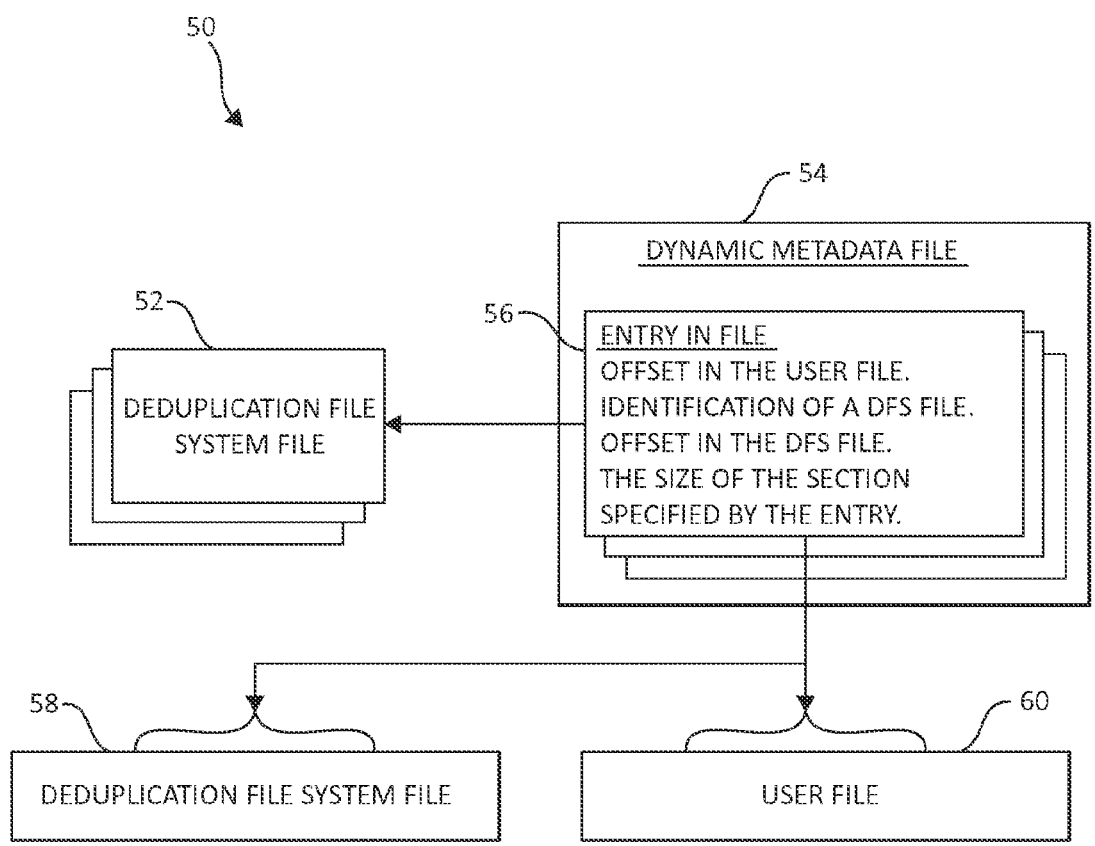
FIG. 3 illustrates an exemplary dynamic metadata file structure, in which various aspects of the illustrated embodiments may be implemented.

FIG. 3 is a block diagram illustration of an exemplary dynamic metadata file structure 50, again in which various aspects of the illustrated embodiments may be implemented. An individual dynamic metadata file 54 contains one or more entries 56 in the file 54. The entry 56 may include an offset in the user file, an identification of a DFS file, an offset in the DFS file, and the size of the section specified by the entry. The entry 56 may describe and or represent a reference between a section in a user file 60 and a section in a deduplication file system file 58, as shown. The dynamic metadata file 54 references, by means of its contained entries 56, a plurality of deduplication file system files 52 as shown.

To implement a rewrite operation within an existing user file, two exemplary embodiments are provided, which may be implemented in the dynamic layer. In the general case the input is a set of rewrite operations to be performed on an existing user file. A private case may be a single rewrite operation to be performed.

Figure 4:
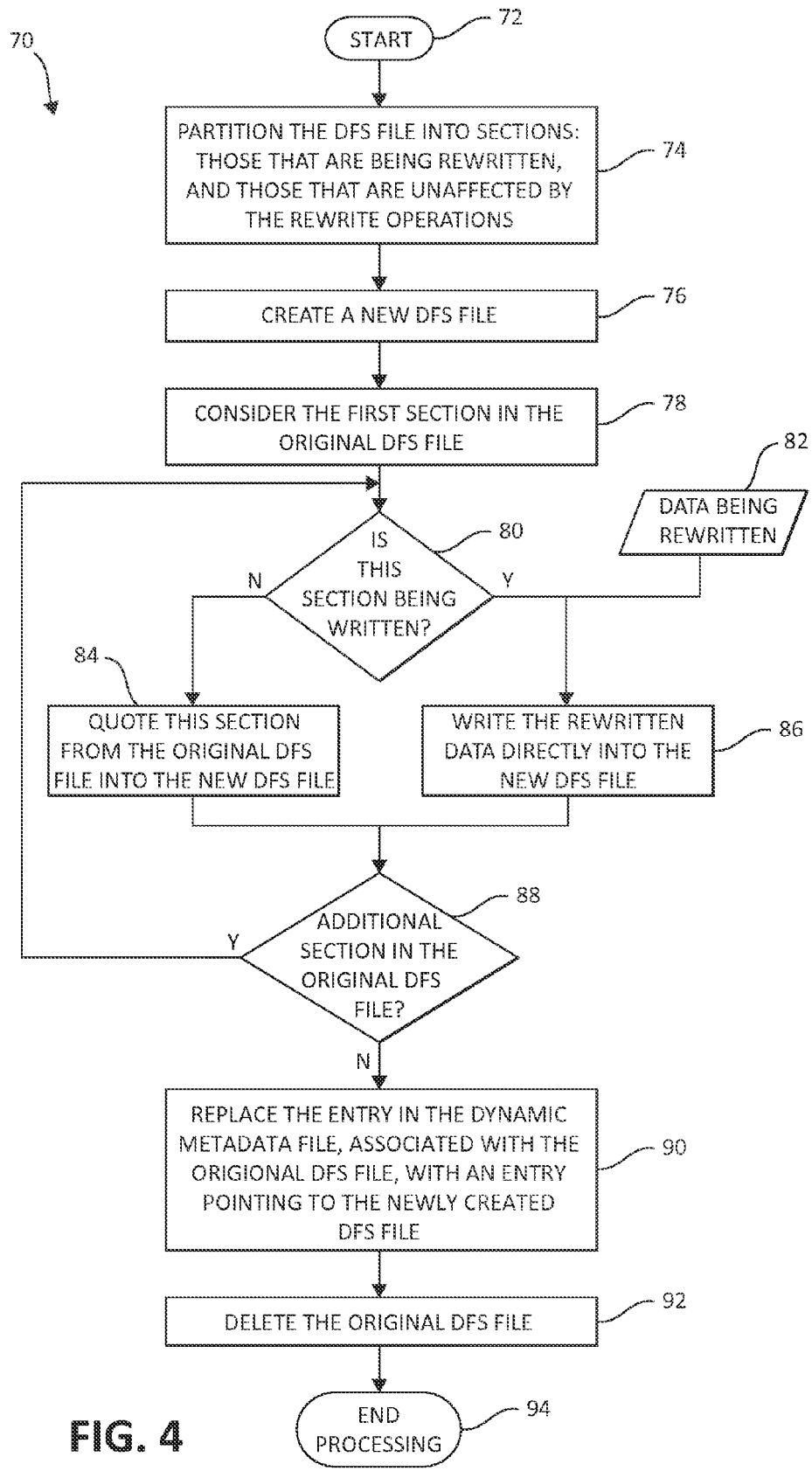
FIG. 4 illustrates a first exemplary method for dynamic rewrite of files within a deduplication storage environment.

Turning now to FIG. 4, a flow chart illustration of first exemplary method 70 for dynamic rewriting of files in a deduplicated storage environment is shown. In one embodiment, method 70 may be implemented using deduplication system 30 (FIG. 1) components, or various other processing, networking, and storage components in computing environments. As one skilled in the art will appreciate, various steps in the method 70 may be implemented in differing ways to suit a particular application. In addition, the described method may be implemented by various means, such as hardware, software, firmware, or a combination thereof operational on or otherwise associated with the computing environment. For example, the method 70 may be implemented, partially or wholly, as a computer program product including a computer-readable storage medium having computer-readable program code portions stored therein. The computer-readable storage medium may include disk drives (including solid state devices), flash memory, digital versatile disks (DVDs), compact disks (CDs), and other types of storage mediums as have been previously described.

FIG. 4 concentrates on the processing of a single DFS file, to which rewrite operations are being applied. In the full procedure the flow illustrated in FIG. 4, following, is performed for each DFS file to which rewrite operations are being applied. Method 70 begins (step 72) by grouping the rewrite operations into sets according to their association with the different DFS files, which is deduced based on their offsets in the user file. For each DFS file where rewrite operations are applicable: the DFS file is partitioned into sections, those that are being rewritten, and those that are unaffected by the rewrite operations (step 74). A new DFS file is created (step 76). Using a sequential procedure (step 78), sections of the new DFS file, corresponding to the sections of the original DFS file, are sequentially added into the new file in the following manner: sections in the original DFS file, which are not affected by the rewrites (step 80), are quoted from the original DFS file into the new DFS file (step 84). Sections in the original DFS file, which are affected by the rewrites (i.e. these sections are rewritten by new data 82) (again, step 80), are directly written into the new DFS file (step 86).

If an additional section in the original DFS file is found (step 88), the method 70 returns to step 80 for analysis of the additional section. If no additional sections in the original DFS file are found (again, step 88), the entry in the dynamic metadata file, associated with the original DFS file, is replaced with an entry pointing to the newly created DFS file) (step 90). The original DFS file is deleted (step 92). Note that when this deletion is applied, since the data that was quoted is still referenced (by the new DFS file), the quoted data is not deleted, and only the data that was overwritten by the new rewrites is deleted (if not referenced by other DFS files). The method 70 then ends (step 94).

Figure 5:
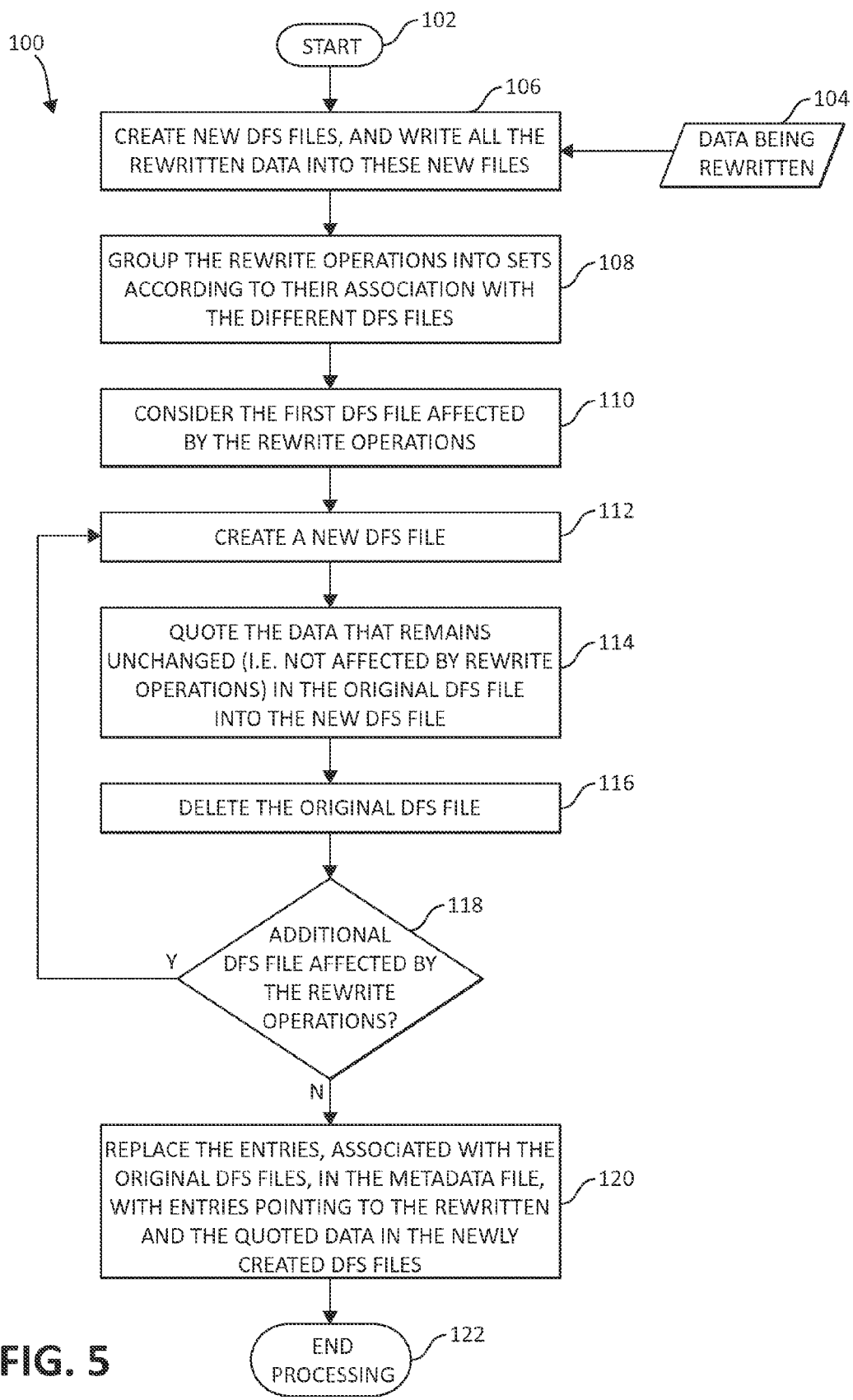
FIG. 5 illustrates a second exemplary method for dynamic rewrite of files within a deduplication storage environment.

Turning now to FIG. 5, a flow chart illustration of second exemplary method 100 for dynamic rewriting of files in a deduplicated storage environment is shown. Method 100 begins (step 102) as new DFS files are created, and the rewritten data (104) is stored in these new files (step 106). The number of new files created depends on the size of the given rewrite operations, and the capacity of a DFS file. Namely, the data within a new sequential DFS file may be non sequential in terms of the user file.

The rewrite operations are grouped into sets according to their association with the different DFS files, which is deduced based on their offsets in the user file (step 108). For each DFS file where rewrite operations are applicable (step 110): a new DFS file is created (step 112). The data that remains unchanged (i.e. not affected by rewrite operations) in the original DFS file is quoted into the new DFS file (step 114). The data that was overwritten by rewrite operations is not quoted.

The original DFS file is deleted (step 116). Note that in this case deletion practically takes effect only on the data that was overwritten by the new rewrites. If additional DFS files are determined to be affected by the rewrite operations (step 118), then the method 100 returns to step 112 for additional processing as shown. If not, the entries, associated with the original DFS files, in the metadata file, are replaced with entries pointing to the rewritten and the quoted data in the newly created DFS files (step 120). The method 100 then ends (step 122).

Exemplary benefits of the first and second illustrated flow embodiments shown previously include the following. First, processing time efficiency is improved. Using the quoting functionality makes the rewrite procedure more efficient in processing time. An alternative of using the quoting functionality to avoid loss of storage, is to copy the actual data. In deduplication file systems, quoting data is generally significantly more efficient than copying data. Second, the rewrite functionality is implemented without any loss of storage, since using the quoting functionality enables to eliminate the data being overwritten.

Figure 6:
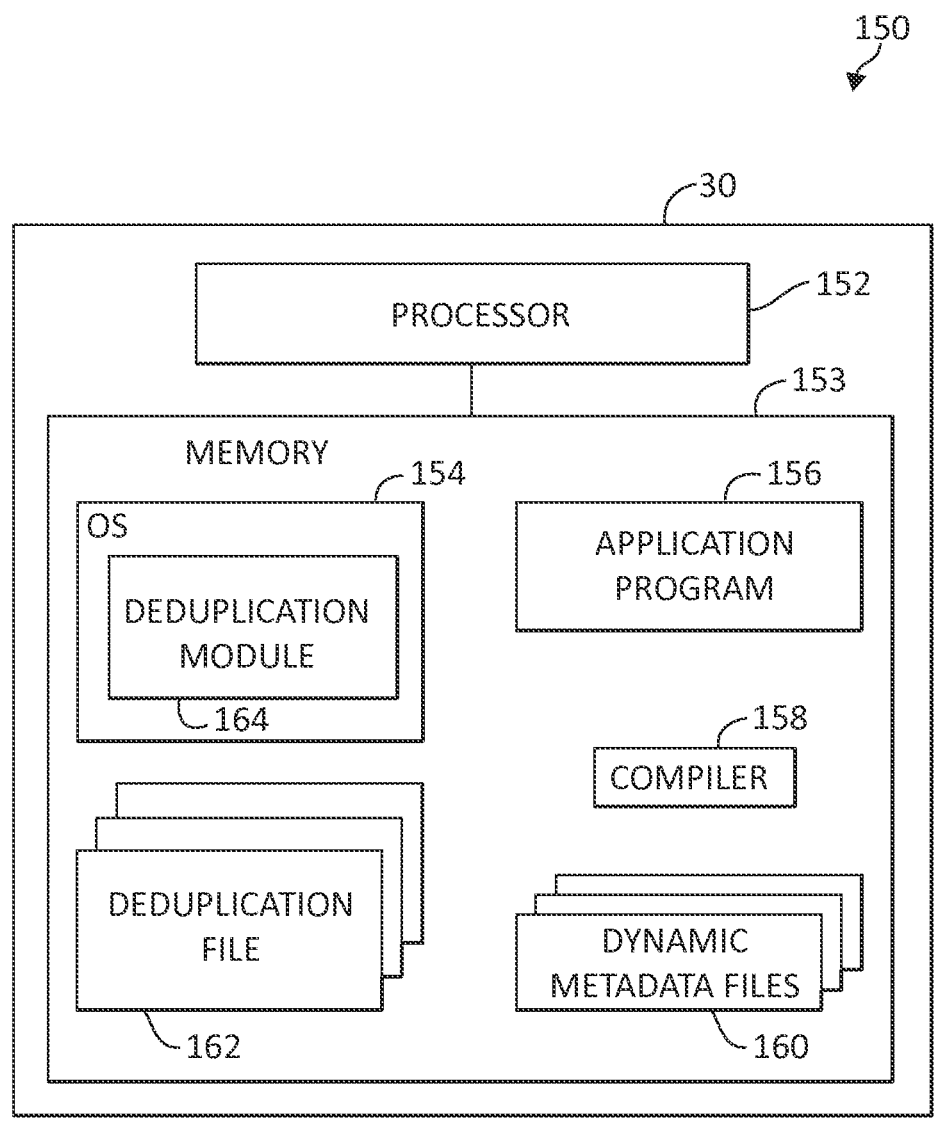
FIG. 6 illustrates exemplary components in a deduplication storage environment that may be specifically adapted for carrying out various aspects of the illustrated embodiments.

Turning now to FIG. 6, an exemplary portion 150 of a deduplication system 30 as also seen in FIG. 1, previously, is illustrated. Portion 150 of deduplication 30 is operable in a computer environment as a portion thereof, in which mechanisms of the following illustrated embodiments may be implemented. It should be appreciated, however, that FIG. 6 is only exemplary and is not intended to state or imply any limitation as to the particular architectures in which the exemplary aspects of the various embodiments may be implemented. Many modifications to the architecture depicted in FIG. 6 may be made without departing from the scope and spirit of the following description and claimed subject matter.

Deduplication system 30 includes a processor 152 and a memory 153, such as random access memory (RAM). The deduplication system 30 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 30.

In the illustrated embodiment, the deduplication system 30 operates under control of an operating system (OS) 154 (e.g. z/OS, OS/2, LINUX, UNIX, WINDOWS, MAC OS) stored in the memory 153, and interfaces with the user to accept inputs and commands and to present results. In one embodiment of the present invention, the OS 154 facilitates rate control mechanisms according to the present invention. To this end, OS 154 includes a deduplication module 164 which may be adapted for carrying out various processes and mechanisms in the exemplary methods described previously.

The deduplication system 30 may implement a compiler 158 that allows an application program 156 written in a programming language such as COBOL, PL/1, C, C++, JAVA, ADA, BASIC, VISUAL BASIC or any other programming language to be translated into code that is readable by the processor 152. After completion, the application program 156 accesses and manipulates data stored in the memory 153 of the system 30 using the relationships and logic that was generated using the compiler 158.

To further implement and execute mechanisms and processes according to the present invention, OS 154, in conjunction with memory 153, processor 152, application program 56, and other computer processing, networking, and storage components, may implement and/or maintain deduplication files 162 and dynamic metadata files 160 as previously described. As the skilled artisan will appreciate, the mechanisms of deduplication files 162 and dynamic metadata files 160 as presently illustrated may be implemented in various forms and architectures. Accordingly, the illustration of deduplication files 162 and dynamic metadata files 160 in the present figure is again intended to demonstrate logical relationships between possible computing components in the deduplication system 30, and not to imply a specific physical structure or relationship.

In one embodiment, instructions implementing the operating system 154, the application program 156, and the 158, as well as the deduplication files 162 and the dynamic metadata files 160 are tangibly embodied in a computer-readable medium, which may include one or more fixed or removable data storage devices, such as a zip drive, disk, hard drive, DVD/CD-ROM, digital tape, SSDs, etc. Further, the operating system 154 and the application program 156 comprise instructions which, when read and executed by the system 30, cause the system 30 to perform the steps necessary to implement and/or use the present invention. Application program 156 and/or operating system 154 instructions may also be tangibly embodied in the memory 53 and/or transmitted through or accessed by network 20 via various components (e.g., router 32, FIG. 1). As such, the terms "article of manufacture," "program storage device" and "computer program product" as may be used herein are intended to encompass a computer program accessible and/or operable from any computer readable device or media.

Embodiments of the present invention may include one or more associated software application programs 156 that include, for example, functions for managing a distributed computer system comprising a network of computing devices, such as a storage area network (SAN). Accordingly, processor 152 may comprise one or more storage management processors (SMP). The application program 156 may operate within a single computer and/or deduplication system 30 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for rewriting data in a deduplication storage environment, comprising:
    a plurality of user files including original deduplication (DFS) files;
    a sequential deduplication file system in communication with the plurality of user files;
    a dynamic non-deduplicated file system in communication with the plurality of user files including a plurality of dynamic metadata files having entries pointing to corresponding sections of the original DFS files; and
    at least one processor device, operable in the deduplication storage environment, wherein the at least one processor device is adapted for:
        creating a new deduplication file system (DFS) file to be stored as part of the plurality of user files,
        directly writing rewritten sections of one of the original DFS files resulting from rewrite operations into the new DFS file,
        quoting unmodified sections of the one of the original DFS files unaffected by rewrite operations into the new DFS file, and
        deleting the one of the original DFS files.

2. The system of claim 1, wherein the at least one processor device is further adapted for quoting the unmodified sections of the one of the original DFS files into additional new DFS files.

3. The system of claim 1, wherein the sequential deduplication file system is static.

4. The system of claim 1, wherein the entries of one of the dynamic metadata files may be modified to reflect a new layout of one of the user files over the DFS files.

5. A computer program product for rewriting data in a deduplication storage environment by at least one processor device, the computer program product comprising a computer-readable storage medium having computer-readable program code portions stored therein, the computer-readable program code portions comprising:
    a first executable portion for creating a new deduplication file system (DFS) file to be stored as part of a plurality of user files, the plurality of user files including original deduplication file system (DFS) files and being accessible by a sequential deduplication file system and a dynamic non-deduplicated file system, the dynamic non-deduplicated file system including a plurality of dynamic metadata files having entries pointing to corresponding sections of the original DFS files;
    a second executable portion for directly writing rewritten sections of one of the original DFS files resulting from rewrite operations into the new DFS file;
    a third executable portion for quoting unmodified sections of the one of the original DFS files unaffected by rewrite operations into the new DFS file; and
    a fourth executable portion for deleting the one of the original DFS files.

6. The computer program product of claim 5, wherein quoting the unmodified sections of the one of the original DFS files may be performed into additional new DFS files.

7. The computer program product of claim 5, wherein the sequential deduplication file system is static.

8. The computer program product of claim 5, wherein the entries of one of the dynamic metadata files may be modified to reflect a new layout of one of the user files over the DFS files.

9. The system of claim 1, further comprising a dynamic file system layer configured to use the sequential deduplication file system and the dynamic non-deduplicated file system to implement the user files.

10. The system of claim 2, wherein the dynamic file system layer is above the sequential deduplication file system and the dynamic non-deduplicated file system.

11. The system of claim 4, further comprising replacing entries in a dynamic metadata file associated with the deleted one of the original DFS files with new entries pointing to the new DFS.

12. The computer program product of claim 5, further comprising a fifth executable portion for implementing the user files using a dynamic file system layer configured to use the sequential deduplication file system and the dynamic non-deduplicated file system to implement the user files.

13. The computer program product of claim 12, wherein the dynamic file system layer is above the sequential deduplication file system and the dynamic non-deduplicated file system.

14. The computer program product of claim 8, further comprising a fifth executable portion for replacing entries in a dynamic metadata file associated with the deleted one of the original DFS files with new entries pointing to the new DFS.

* * * * *